United States Patent
Stansbury, III (10) Patent No.: US 8,261,865 B2
(45) Date of Patent: Sep. 11, 2012

(54) REGENERATIVE SUSPENSION WITH ACCUMULATOR SYSTEMS AND METHODS

(75) Inventor: James A. Stansbury, III, Lake Havasu City, AZ (US)

(73) Assignee: Physics Lab of Lake Havasu, LLC, Lake Havasu City, AZ (US)

( * ) Notice: Subject to any disclaimer, the term of this patent is extended or adjusted under 35 U.S.C. 154(b) by 0 days.

(21) Appl. No.: 12/842,765

(22) Filed: Jul. 23, 2010

(65) Prior Publication Data

US 2010/0281858 A1 Nov. 11, 2010

Related U.S. Application Data

(63) Continuation-in-part of application No. 12/206,082, filed on Sep. 8, 2008, now Pat. No. 7,938,217.

(60) Provisional application No. 61/035,494, filed on Mar. 11, 2008.

(51) Int. Cl.
*B60K 25/10* (2006.01)
(52) U.S. Cl. .................................................. 180/65.31
(58) Field of Classification Search ................. 180/165, 180/65.3, 65.1, 65.29, 65.21–65.22, 175, 180/202, 305, 306; 60/325, 327, 413, 419
See application file for complete search history.

(56) References Cited

U.S. PATENT DOCUMENTS

| | | | |
|---|---|---|---|
| 1,557,570 A * | 10/1925 | Eckman et al. | ............ 180/65.31 |
| 3,499,163 A | 3/1970 | Verreault | |
| 3,880,250 A | 4/1975 | Emanuele | |
| 3,921,746 A * | 11/1975 | Lewus | ............ 180/165 |
| 3,947,744 A | 3/1976 | Grace et al. | |
| 3,980,152 A | 9/1976 | Manor | |
| 4,009,395 A | 2/1977 | Long et al. | |
| 4,024,926 A * | 5/1977 | Butoi | ............ 180/65.245 |
| 4,032,829 A * | 6/1977 | Schenavar | ............ 322/3 |
| 4,113,047 A | 9/1978 | Turner | |
| 4,218,624 A | 8/1980 | Schiavone | |
| 4,222,450 A | 9/1980 | Fobbs | |
| 4,295,538 A * | 10/1981 | Lewus | ............ 180/165 |
| 4,381,041 A * | 4/1983 | Butoi | ............ 180/65.31 |
| 4,387,781 A | 6/1983 | Ezell et al. | |
| 4,815,575 A | 3/1989 | Murty | |
| 5,077,515 A | 12/1991 | St. Arnauld | |
| 5,091,679 A | 2/1992 | Murty et al. | |

(Continued)

FOREIGN PATENT DOCUMENTS

WO 2007050526 5/2007

(Continued)

OTHER PUBLICATIONS

Non-final rejection mailed Dec. 10, 2010 in U.S. Appl. No. 12/206,082.

(Continued)

*Primary Examiner* — John Walters
*Assistant Examiner* — James Triggs
(74) *Attorney, Agent, or Firm* — Snell & Wilmer L.L.P.

(57) ABSTRACT

In exemplary embodiments, a regenerative suspension system replaces or complements a standard shock absorber on a vehicle. A pump attaches via a hose to a central accumulator cylinder that is mounted on a vehicle. Pressurized fluid, air, or other material charges the accumulator. The Pressurized fluid, air, or other material is controllably released via a valve in order to perform work.

21 Claims, 9 Drawing Sheets

U.S. PATENT DOCUMENTS

| | | | |
|---|---|---|---|
| 5,178,403 A * | 1/1993 | Kemner et al. | 280/423.1 |
| 5,215,156 A | 6/1993 | Stulbach et al. | |
| 5,296,785 A | 3/1994 | Miller | |
| 5,337,560 A | 8/1994 | Abdelmalek | |
| 5,590,734 A | 1/1997 | Caires | |
| 6,394,238 B1 | 5/2002 | Rogala | |
| 6,460,332 B1 | 10/2002 | Maruta et al. | |
| 6,575,484 B2 | 6/2003 | Rogala et al. | |
| 6,734,575 B2 | 5/2004 | Ricketts | |
| 6,734,645 B2 | 5/2004 | Auerbach | |
| 6,748,737 B2 * | 6/2004 | Lafferty | 60/398 |
| 6,756,694 B2 | 6/2004 | Ricketts | |
| 6,828,691 B2 | 12/2004 | Tu et al. | |
| 6,860,332 B1 | 3/2005 | Archer et al. | |
| 6,877,577 B1 | 4/2005 | Smith | |
| 6,920,951 B2 * | 7/2005 | Song et al. | 180/165 |
| 6,949,840 B2 | 9/2005 | Ricketts | |
| 6,952,060 B2 | 10/2005 | Goldner et al. | |
| 6,966,394 B2 | 11/2005 | Fleming | |
| 6,971,232 B2 | 12/2005 | Singh | |
| 7,009,350 B1 | 3/2006 | Gold | |
| 7,087,342 B2 | 8/2006 | Song et al. | |
| 7,143,851 B2 | 12/2006 | Masterson | |
| 7,145,257 B2 | 12/2006 | Ricketts | |
| 7,147,069 B2 | 12/2006 | Maberry | |
| 7,161,254 B1 | 1/2007 | Janky et al. | |
| 7,197,871 B2 | 4/2007 | Yoshino | |
| 7,205,732 B1 | 4/2007 | Gold | |
| 7,208,894 B1 | 4/2007 | Earle | |
| 7,211,905 B1 | 5/2007 | McDavid, Jr. | |
| 7,213,665 B2 | 5/2007 | Yamaguchi et al. | |
| 7,239,031 B2 | 7/2007 | Ricketts | |
| 7,261,170 B2 | 8/2007 | Leifert | |
| 7,261,171 B2 | 8/2007 | de la Torre et al. | |
| 7,308,959 B2 | 12/2007 | Roberts | |
| 7,311,163 B2 | 12/2007 | Oliver | |
| 7,361,999 B2 | 4/2008 | Yeh | |
| 7,408,266 B2 | 8/2008 | Yeh | |
| 7,615,900 B1 | 11/2009 | Harris | |
| 7,629,700 B2 | 12/2009 | Begley et al. | |
| 7,638,889 B2 | 12/2009 | Yeh | |
| 7,703,563 B2 | 4/2010 | Aldrich et al. | |
| 2003/0015846 A1 * | 1/2003 | Rogala et al. | 280/5.514 |
| 2003/0030523 A1 * | 2/2003 | Bell et al. | 335/220 |
| 2004/0206561 A1 * | 10/2004 | Song et al. | 180/165 |
| 2006/0016629 A1 | 1/2006 | Huard | |
| 2006/0125325 A1 * | 6/2006 | Beaulieu | 310/12 |
| 2007/0074918 A1 | 4/2007 | Meyer | |
| 2007/0089924 A1 | 4/2007 | de la Torre et al. | |
| 2007/0273153 A1 | 11/2007 | de la Torre et al. | |
| 2008/0083222 A1 * | 4/2008 | Hubert | 60/698 |
| 2008/0257626 A1 * | 10/2008 | Carabelli et al. | 180/165 |

FOREIGN PATENT DOCUMENTS

| | | |
|---|---|---|
| WO | 2007134029 | 11/2007 |
| WO | 2008005667 | 1/2008 |

OTHER PUBLICATIONS

"Haldex's EMS—No More Transmission?" by Mike Osenga, Diesel Progress International Edition, Mar.-Apr. 2010.

* cited by examiner

REGENERATIVE SUSPENSION WITH ACCUMULATOR SYSTEMS AND METHODS

CROSS-REFERENCE TO RELATED APPLICATIONS

This application is a continuation-in-part of application Ser. No. 12/206,082, entitled REGENERATIVE SUSPENSION WITH ACCUMULATOR SYSTEMS AND METHODS, filed Sep. 8, 2008, which claims the benefit of U.S. Provisional Patent Application Ser. No. 61/035,494, entitled HYDRAULIC/AIR SUSPENSION ENERGY RETURN, filed Mar. 11, 2008, both of which are incorporated by reference herein in their entireties.

BACKGROUND OF THE INVENTION

Hybrids, semi-tractors and their trailers, locomotives, military and other vehicles have few ways to perform work without burning fuel. In our society, the cost of fuel has been growing more expensive every month. Many people have switched to driving hybrids in order to save money on fuel. In some hybrids and other heavy vehicles, a regenerative suspension system may be used to extend the range of batteries, improve efficiency, and/or reduce the fuel consumption.

There nevertheless still exists a need in the prior art to address regenerative suspension system shortcomings. For example, because variations on driving surfaces are subtle, existing systems do not produce enough hydraulic or pneumatic pressure to efficiently operate motors and electric generators.

SUMMARY OF THE INVENTION

In exemplary embodiments, a regenerative suspension system replaces or complements a standard shock absorber on a vehicle. A pump attaches via a hose to a central accumulator cylinder that is mounted on a vehicle. Pressurized fluid, air, or other material charges the accumulator. The accumulator is coupled to a motor via a solenoid valve, or other automatic pressure relief valve, as in air brake systems on tractors, which releases high-pressure fluid or air into the motor. The motor is coupled to an electric generator. The rotating motion of the motor spins the generator shaft. Electricity created by the generator may be fed back into one or more batteries or energy storage elements in the vehicle. Thus, the vehicle's battery may be recharged by energy captured from road variation and suspension movement.

BRIEF DESCRIPTION OF THE DRAWINGS

A more complete understanding of the present invention may be derived by referring to the detailed description and claims when considered in connection with the accompanying Figures, where like reference numbers refer to similar elements throughout the Figures, and:

DETAILED DESCRIPTION

The detailed description of exemplary embodiments herein makes reference to the accompanying Figures, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In accordance with exemplary embodiments, a regenerative suspension system comprises an arrangement of components that work together to perform work (e.g., generate electricity) from the reciprocating suspension movement of a vehicle and its weight. In exemplary embodiments, this invention is used in conjunction with SUVs, semi-tractors, military vehicles and locomotives and/or their respective trailers.

In accordance with exemplary embodiments, systems and methods are disclosed herein which may be used in place of fuel combustion engines or in connection therewith. For example, this product may be especially useful for owners of hybrids and plug-in vehicles. In general, anyone can use the systems and methods described herein to perform work without burning fuel.

In accordance with exemplary embodiments, a regenerative suspension system can be utilized by a vehicle to produce electricity via hydraulic or pneumatic shocks. The systems and methods described herein may exploit movement of a shock absorber or other suitable displacement or physical force to pressurize one or more accumulators and generate electricity or other forms of useable power.

In an exemplary embodiment, a regenerative suspension system can be utilized as an electric source to provide electrolysis to aid in increasing fuel mileage, without causing a load on the vehicle's electrical system.

In exemplary embodiments, a regenerative suspension system replaces or complements a standard shock absorber on a vehicle. A pump attaches via a hose to a central accumulator cylinder that is mounted, for example, along the frame rails underneath the vehicle. Pressurized fluid, air, or other material charges the accumulator. The accumulator is coupled to a motor via a solenoid valve, or other automatic pressure relief valve, which releases high-pressure fluid or air into the motor. The motor is coupled to an electric generator. The rotating motion of the motor spins the generator shaft. Electricity created by the generator is fed back into one or more batteries in the vehicle. Thus, the vehicle's battery is recharged by energy captured from road variation and suspension movement. In exemplary embodiments, the fluid or air then returns via a low-pressure hose to a reservoir. From the reservoir, the fluid or air may return to the shock absorber to continue the energy generation process.

In exemplary embodiments, a regenerative suspension system is manufactured as an accessory for existing vehicles. In other exemplary embodiments, a regenerative suspension system is manufactured as an option on new automobiles. The exact dimensions, configuration, and materials used for the systems and methods described herein may vary in accordance with factors such as load application, vehicle size, number of vehicle batteries, vehicle accessories, vehicle speed, vehicle power, vehicle engine configuration, expense of manufacture, and/or the like.

Figure 1:
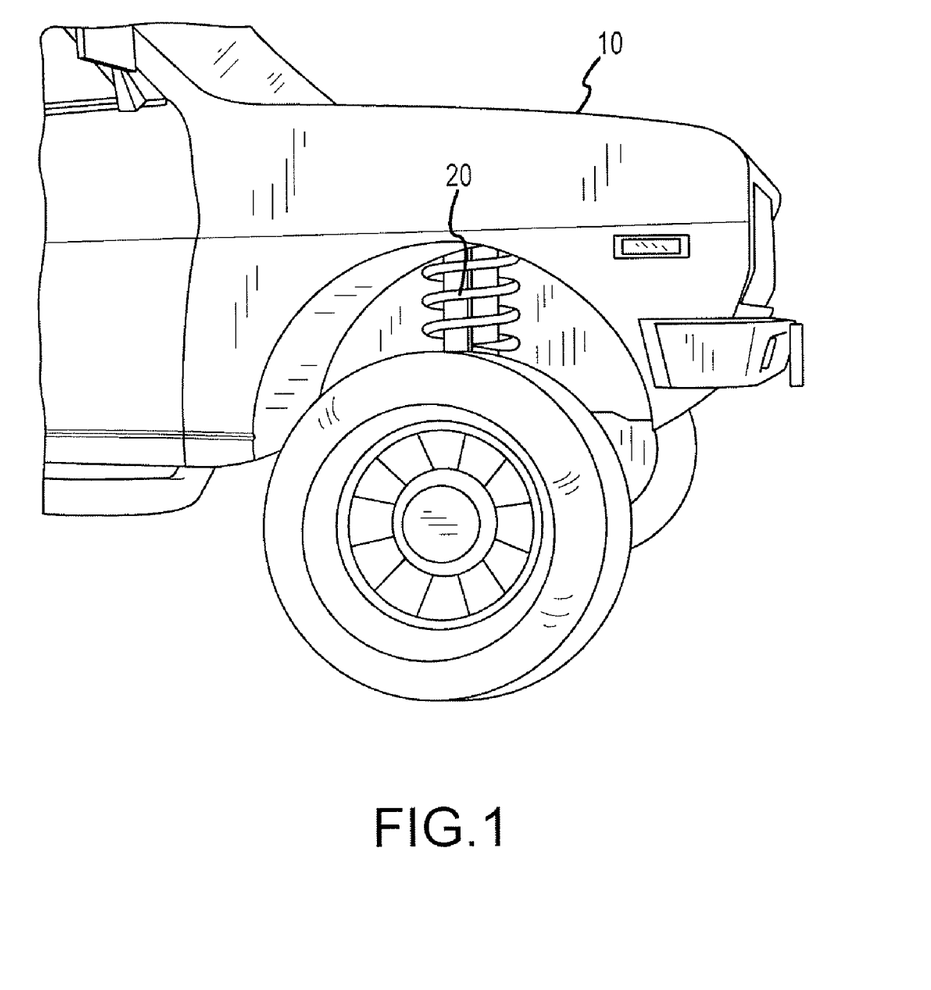
FIG. 1 illustrates a pump on a vehicle in accordance with an exemplary embodiment.

Turning now to the Figures, in accordance with exemplary embodiments, and with reference to FIG. 1, a regenerative suspension system comprises one or more pumps 20. Pumps 20 may be coupled to vehicle 10. While only one pump 20 is illustrated and described for simplicity, one skilled in the art will appreciate that any number of pumps 20 may be used. Moreover, the number of pumps 20 may, but need not necessarily, correspond to the number of wheels on a vehicle. For example, a vehicle having 4 wheels may have 1, 2, 3, 4 or more pumps 20. Moreover, a pump 20 may, but need not necessarily, be located next to a wheel. For example, a pump 20 may be located anywhere along an axle or a drive train. More broadly, a pump 20 may be disposed anywhere there is motion associated with a vehicle 10. For instance, in the case that vehicle 10 comprises a loader or tractor, a pump 20 may be associated with each of the pistons or pumps used to raise and lower the bucket or blade. Thus, in this example, energy associated with lowering the bucket or blade may be captured by one or more pumps 20. Moreover, a pump 20 may be used in connection with a non-wheeled vehicle, such as a tracked vehicle (e.g. a tank, an armored personnel carrier, a crawler tractor, bulldozer, a snowmobile, a backhoe, an excavator, and the like), a watercraft, a hovercraft, and/or any other moving vehicle or system wherein kinetic energy may be captured and stored.

Further, vehicle 10 may comprise a gasoline engine, a diesel engine, a jet engine, and the like. Moreover, vehicle 10 may comprise, for example, a four-stroke engine, a two-stroke engine, a pistonless rotary engine, and/or a radial engine. Vehicle 10 may also comprise an electric powered vehicle, a fuel cell vehicle, a solar powered vehicle, and/or any other vehicle configured to move across a surface.

In various exemplary embodiments, pump 20 comprises a hydraulic damper or a pneumatic damper. Pump 20 may also be used with a spring. In exemplary embodiments, pump 20 comprises one or more double acting fluid or air cylinders, as illustrated in FIG. 1.

Exemplary fluids for use with a regenerative suspension system include conventional hydraulic fluids (e.g. brake fluids, automatic transmission fluids, and the like). However, any fluid suitable for transferring hydraulic force may be used in accordance with various embodiments. Similarly, while air is referred to herein, nitrogen, helium, argon, and/or any other suitable inert and/or stable gas or gas mixture may be used in place thereof, in accordance with various embodiments.

In exemplary embodiments, pump 20 is coupled to an axle. Thereby, pump 20 exploits compressive forces generated as the tire encounters bumps or other road variations in order to pressurize pump 20. In an exemplary embodiment, pump 20 comprises one or more hydraulic or pneumatic shocks coupled to the wheel, axle or drive train of the vehicle. In another exemplary embodiment, not shown, pump 20 is coupled to an independent shock via a rod or flange and the independent shock is in turn coupled to the wheel, axle or drive train of the vehicle. In yet another exemplary embodiment, pump 20 comprises one or more hydraulic or pneumatic shocks coupled to the hull of a watercraft to pressurize pump 20 as the hull encounters waves or other water variations.

Figure 2:
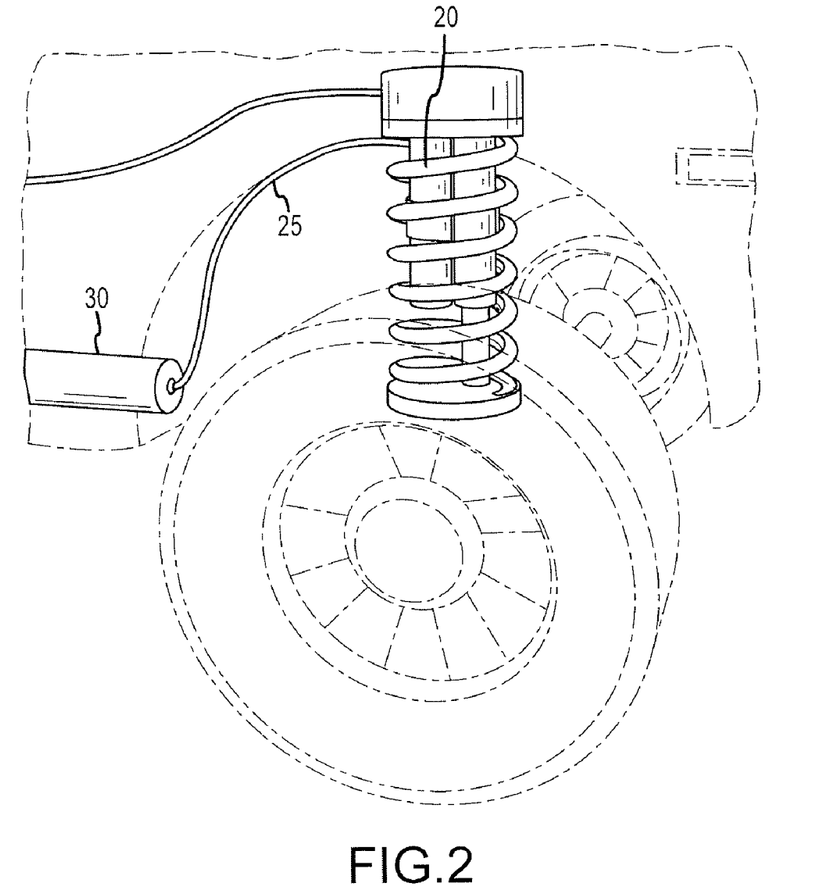
FIG. 2 illustrates a pump and an accumulator in accordance with an exemplary embodiment.

In an exemplary embodiment, and turning to FIG. 2, pressurized fluid or air within pump 20 passes to an accumulator 30 via a conduit 25. In accordance with one aspect of an exemplary embodiment, conduit 25 is a rubber (e.g., EPDM, silicone with polyester) synthetic, metal, or plastic (e.g., hardened plastic) hose with a fastener, coupling, clamp, bracket, clip or other means known in the art or hereinafter developed, on one or both ends. In accordance with one aspect of an exemplary embodiment, conduit 25 comprises one or more one-way or check valves to prevent leakage of fluid or air back into pump 20. In one embodiment, as shown, conduit 25 is coupled to pump 20 at the top thereof, however, it should be appreciated that conduit 25 may be coupled to the middle or bottom of pump 20. Moreover, conduit 25 may be coupled to pump 20 at any suitable location and in any suitable manner configured to allow pressurized fluid or air to exit pump 20 in a controlled manner.

In accordance with exemplary embodiments, accumulator 30 is configured to be charged with fluid as a cylindrical hydraulic accumulator, or with air as an air storage tank. However, accumulator 30 may be suitably configured as a hydraulic accumulator, bladder accumulator, piston accumulator, spring accumulator, and the like, or as any other energy storage unit as known in the art. In accordance with one aspect of an exemplary embodiment, accumulator 30 is configured to be pressurized with fluid or air, e.g, from about 100 to about 1000 pounds per square inch (psi) air and from about 1000 to about 5000 psi fluid. However, accumulator 30 may be configured outside of this range depending on the application and/or weight of the vehicle.

While accumulator 30 may be otherwise configured, accumulator 30 in an exemplary embodiment is located in the main line. In other words, accumulator 30 may be functionally situated/positioned and configured so that all pressurized fluid or air within pump 20 passes directly to accumulator 30 via conduit 25, i.e, before passing to a hydraulic motor or an air motor. This is advantageous because for certain applications, it is more efficient to release high pressure fluid or air sporadically than low pressure fluid or air continuously. And in some embodiments, the most efficient pressure can only be built up over time in an accumulator. This may hold true for example, when using the high pressure fluid or air to turn an electric generator, as described below.

In an exemplary embodiment, accumulator 30 comprises a volume from about 200 cubic inches to about 2000 cubic inches. However, accumulator 30 may be configured outside of this range depending on the application and/or weight of the vehicle. In various other exemplary embodiments, accumulator 30 comprises any suitable volume configured to capture pressurized fluid or air delivered by one or more pumps 20.

While only one accumulator 30 is illustrated and described for simplicity, one skilled in the art will appreciate that any number of accumulators 30 may be used. For example, a single vehicle may have multiple accumulators 30, in parallel or in series, for different applications, as discussed below. In an exemplary embodiment, a regenerative suspension system comprises a high pressure accumulator (e.g., a charging accumulator) and a low pressure accumulator (e.g., a releasing accumulator). In another exemplary embodiment, more than one accumulator 30 may be used, for example, where more than one pump 20 is used. That is, each pump 20 may have an accumulator associated therewith. In this way, each pump 20 may transfer energy to its own associated accumulator 30. Output from each accumulator 30 may be transferred in series or parallel to the remainder of the regenerative system (described below). Further, multiple accumulators 30 may be located adjacent to multiple pumps 20, or elsewhere in vehicle 10.

In accordance with exemplary embodiments, accumulator 30 is attached to vehicle 10 along the frame rails underneath vehicle 10. However, accumulator 30 may be located in any suitable area of a vehicle.

In general, any of the components described herein may be coupled to each other via bolts, rivets, dowels, welding, soldering, brazing, adhesives, sleeves, brackets, clips, or any other means known in the art or hereinafter developed. The coupling may be permanent or temporary, and the coupling may include an adjustable coupling, thereby allowing the components to be extended away from each other or closer to each other.

Figure 3:
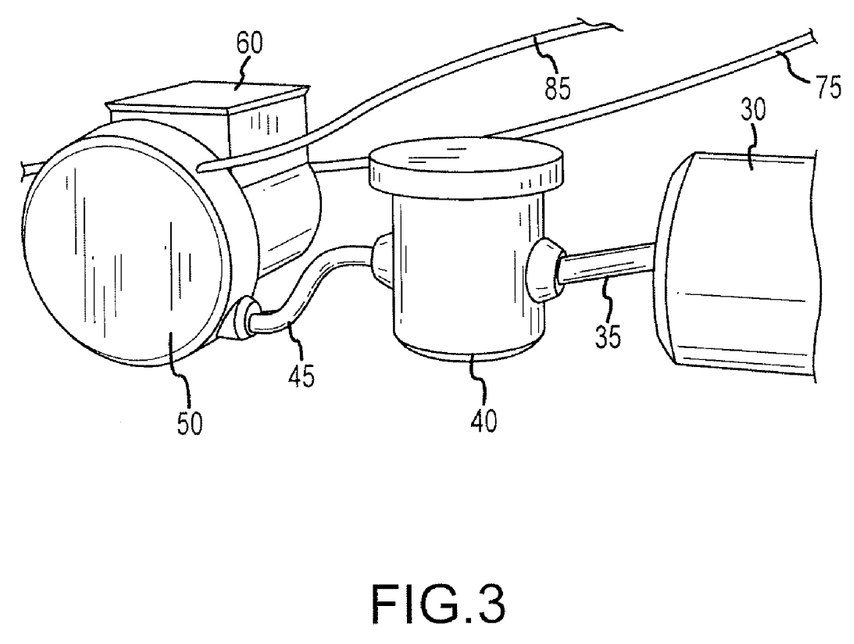
FIG. 3 illustrates a system for charging a battery in accordance with an exemplary embodiment.

In accordance with exemplary embodiments, and turning to FIG. 3, pressurized fluid or air within accumulator 30 passes to a valve 40 via a conduit 35. In accordance with one aspect of an exemplary embodiment, conduit 35 is a rubber (e.g., EPDM, silicone with polyester) synthetic, metal, or plastic (e.g., hardened plastic) hose with a fastener, coupling, clamp, bracket, clip or other means known in the art or hereinafter developed, on one or both ends. In accordance with one aspect of an exemplary embodiment, conduit 35 comprises one or more one-way or check valves to prevent leakage of fluid or air back into accumulator 30.

The high pressure fluid or air bled through valve 40 may be used to perform work in any number of applications, either stand-alone applications or as combinations of applications, some of which are discussed below.

In accordance with exemplary embodiments, valve 40 is configured to open automatically when pressure within accumulator 30 reaches a desired threshold level. In accordance with exemplary embodiments, valve 40 is configured to open when pressure within accumulator 30 reaches from about 100 psi to about 5000 psi. However, valve 40 may be configured outside of this range depending on the application and/or weight of the vehicle. In various exemplary embodiments, valve 40 comprises a one-way check valve, a gate valve, a solenoid valve, or other automatic pressure relief valve, or the like. In various exemplary embodiments, valve 40 is configured to flow fluid at a rate of between about 0.5 gallons per minute to about 6 gallons per minute. In other exemplary embodiments, valve 40 is configured to flow fluid at a rate of between about 2.5 gallons per minute to about 4.5 gallons per minute. However, valve 40 may be configured to flow fluid at any suitable rate configured to allow use of pressure contained within accumulator 30, for example, depending on the application and/or weight of the vehicle.

In an exemplary embodiment, pressurized fluid or air passed through valve 40 is delivered to a motor 50 via a conduit 45. In accordance with one aspect of an exemplary embodiment, conduit 45 is a rubber (e.g., EPDM, silicone with polyester) synthetic, metal, or plastic (e.g., hardened plastic) hose with a fastener, coupling, clamp, bracket, clip or other means known in the art or hereinafter developed, on one or both ends. In accordance with one aspect of an exemplary embodiment, conduit 45 comprises one or more one-way or check valves to prevent leakage of fluid or air back into valve 40.

With continued attention to FIG. 3, and in accordance with exemplary embodiments, motor 50 comprises a hydraulic motor or an air motor (i.e., a reversed air compressor). Motor 50 is rotated by the high pressure fluid or air bled through valve 40. In exemplary embodiments, motor 50 rotates at from about 100 revolutions per minute (rpm) to about 2000 rpm. However, one skilled in the art will appreciate that motor 50 may be configured to rotate at any rate to efficiently capture the kinetic energy from the high pressure fluid or air bled through valve 40.

In an exemplary embodiment, motor 50 transmits kinetic energy to an electric generator 60. In an exemplary embodiment, motor 50 is connected to generator 60 via a pulley system. In various other exemplary embodiments, motor 50 may be coupled to generator 60 via a shared axle, a gearset, a chain, a belt drive, and the like. Moreover, motor 50 may be coupled to generator 60 via any suitable components configured to transmit mechanical power to generator 60. Generator 60 may, but need not necessarily, be co-housed with motor 50.

Figure 7:
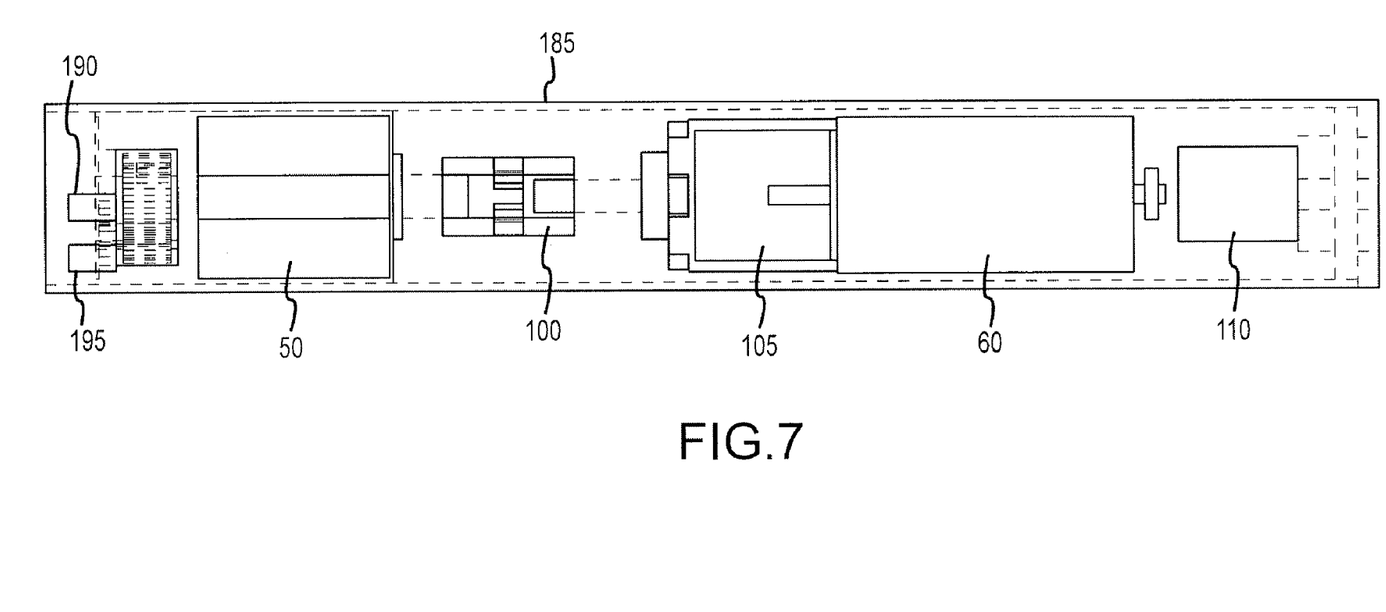
FIG. 7 illustrates a system comprising a motor, an alternator, and an energy storage element in accordance with an exemplary embodiment.

With regard to FIG. 7, an exemplary embodiment comprises motor 50 co-housed with generator 60. Specifically, an exemplary embodiment comprises a housing 185 that encloses motor 50 and alternator 60. For the sake of clarity, the terms "alternator" and "generator" are used interchangeably herein, with the understanding that either may be suitable for the intended purpose of converting mechanical energy into electrical energy. An inlet 190 and an outlet 195 are disposed at a distal end of housing 185 and configured to be mechanically coupled to at least one accumulator 30. In alternative embodiments, inlet 190 is coupled to at least one accumulator 30, while outlet 195 is coupled to at least one reservoir (not shown), which may comprise a part of accumulator 30.

With further regard to FIG. 7, motor 50 may be coupled to inlet 190 and outlet 195. In an exemplary embodiment, motor 50 may be a hydraulic motor, such as one of the Char-Lynn line of hydraulic motors available through Eaton Corporation of Cleveland, Ohio. Motor 50 may be further coupled to alternator 60 through a U-joint 100 as well as a planetary, or epicyclic, gearing system 105, Specifically, motor 50 may be coupled to U-joint 100 which may be coupled to planetary gearing 105. Planetary gearing 105 may transfer rotational energy generated by motor 50 to alternator 60. Planetary gearing 105 may operate to increase, or step-up, the rotational speed at which alternator 60 receives mechanical input.

In an exemplary embodiment, alternator 60 may comprise a permanent magnet alternator ("PMA"). For instance, alternator 60 may in various embodiments comprise an 8-pole motor running in reverse. In alternative embodiments, alternator 60 may comprise brushed or brushless alternators, or any other similar electromechanical device configured to convert mechanical energy to electrical energy.

Alternator 60 may be coupled to an AC-to-DC converter (not shown), such as a rectifier, a switched mode power supply, a programmable power supply, or any other similar device configured to convert alternating current to direct current.

Alternator 60 may be further coupled to an energy storage element 110, either directly or through the AC-to-DC converter. Energy storage element 110 may comprise a capacitor, an inductor, a battery, a fuel cell, and the like. Energy storage element 110 may reside within housing 30. Alternatively, energy storage element 110 may be located outside of housing 30, for example, in a battery storage compartment within vehicle 10 or proximate to the gasoline motor and other standard vehicle engine componentry.

In operation, housing 185 may be mounted conveniently on vehicle 10. Specifically, housing 185 may be mounted in close proximity to at least one accumulator 30. Alternatively, housing 185 may be mounted on an outer surface of vehicle 10 or within an interior compartment such as a trunk space.

Irrespective of the location of housing 185, pressurized fluid or gas is delivered to the accumulator 30 through one or more conduits (not shown) coupled, as described above, from one or more pumps 20. Accumulator 30 thereafter delivers a pressurized flow of the fluid or gas to motor 50. The pressurized flow drives motor 50, which drives planetary gearing 105. In some embodiments, planetary gearing 105 is coupled to motor 50 by way of U-joint 100. In other embodiments, planetary gearing 105 is coupled to motor 50 directly, or, generally, by way of any of a variety of simple rotating mechanical couplings. Planetary gearing 105 turns the magnet or coil (not shown) associated with alternator 60, the rotation of which generates alternating electrical current, or AC power. AC power may be rectified through a rectifier (not shown) or other power supply as described above, after which point a capacitor or other energy storage element 110 may be charged by the DC output therefrom. The energy storage element 110 may supply electrical power throughout the vehicle as described above.

Figure 8:
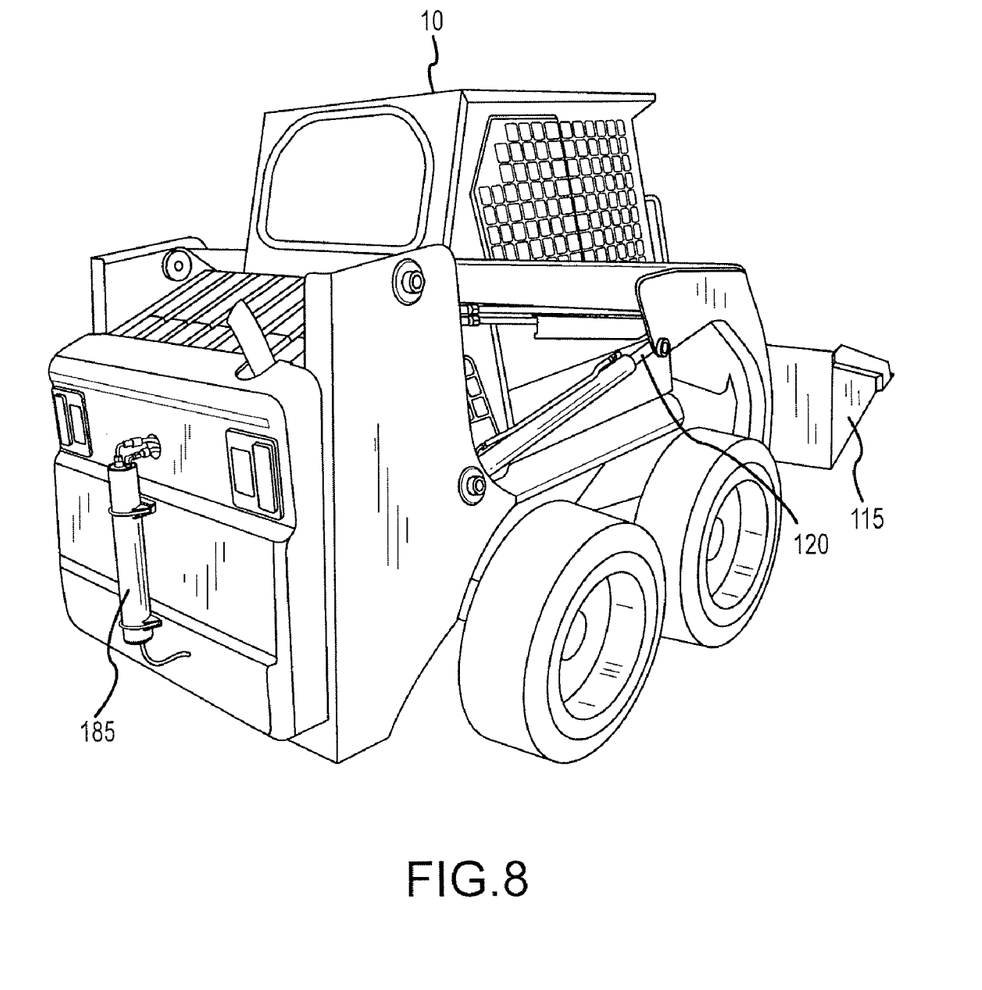
FIG. 8 illustrates a system on a vehicle for charging an energy storage element in accordance with an exemplary embodiment of the invention.

Turning to FIG. 8, vehicle 10 in an exemplary embodiment is a tractor or loader. Specifically, vehicle 10 may comprise a tractor with a bucket or blade 115 mounted thereon. Bucket 115 is coupled to tractor 10 through pistons 120. Pistons 120 may compress fluid or gas, as the bucket is lowered, and this compressed fluid or gas may be delivered to one or more accumulators 30 (not shown). Thus, in certain embodiments, energy may be captured even where a vehicle is not in transit—i.e., where the pump 20 is not absorbing vibrations induced by variations in a driving surface. Experimental data indicates that a tractor based embodiment may generate substantial power. For example, the downward unloaded force generated by bucket 115 may produce in excess of 150 volts at the output of the alternator 60. This is sufficient to light a 120 volt light bulb as the bucket 115 is lowered. Additional power may be generated, of course, where the tractor is operating with a loaded bucket 115.

With respect to the location of housing 185, this may be disposed anywhere on or within vehicle 10. With respect to tractor 10, housing 185 may be disposed on an outer surface. This permits the tractor to operate normally (i.e., the rear surface, in particular, is relatively shielded from damage as the tractor operates), and there is reduced necessity to undertake complicated and potentially costly internal manipulation/redesign of the tractor's internal mechanisms. The housing 185 is merely included as an additional component.

Figure 4:
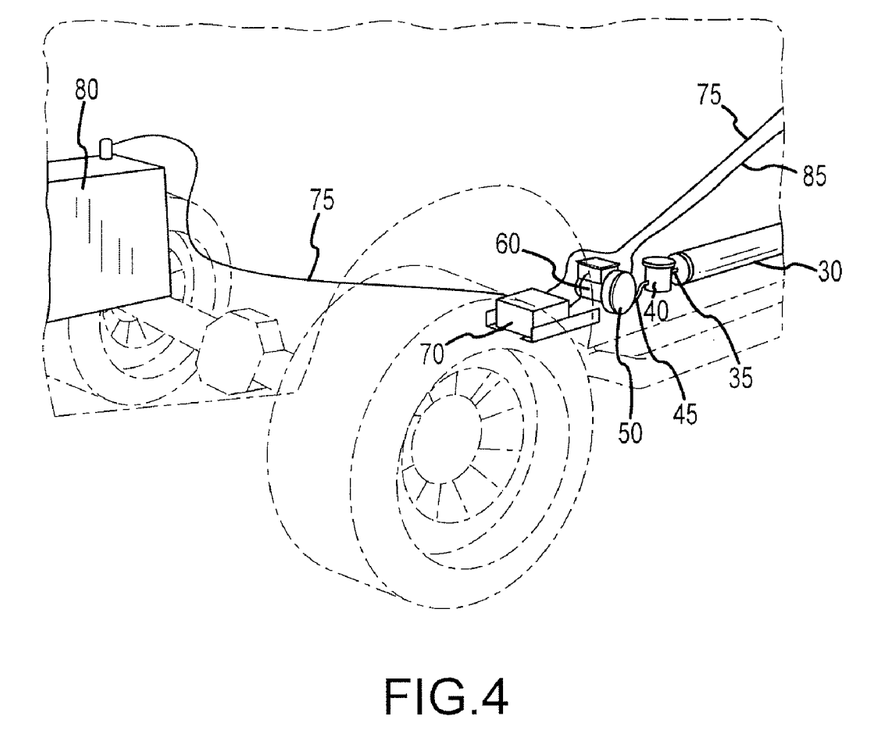
FIG. 4 illustrates another system for charging a battery in accordance with an exemplary embodiment.
Figure 5:
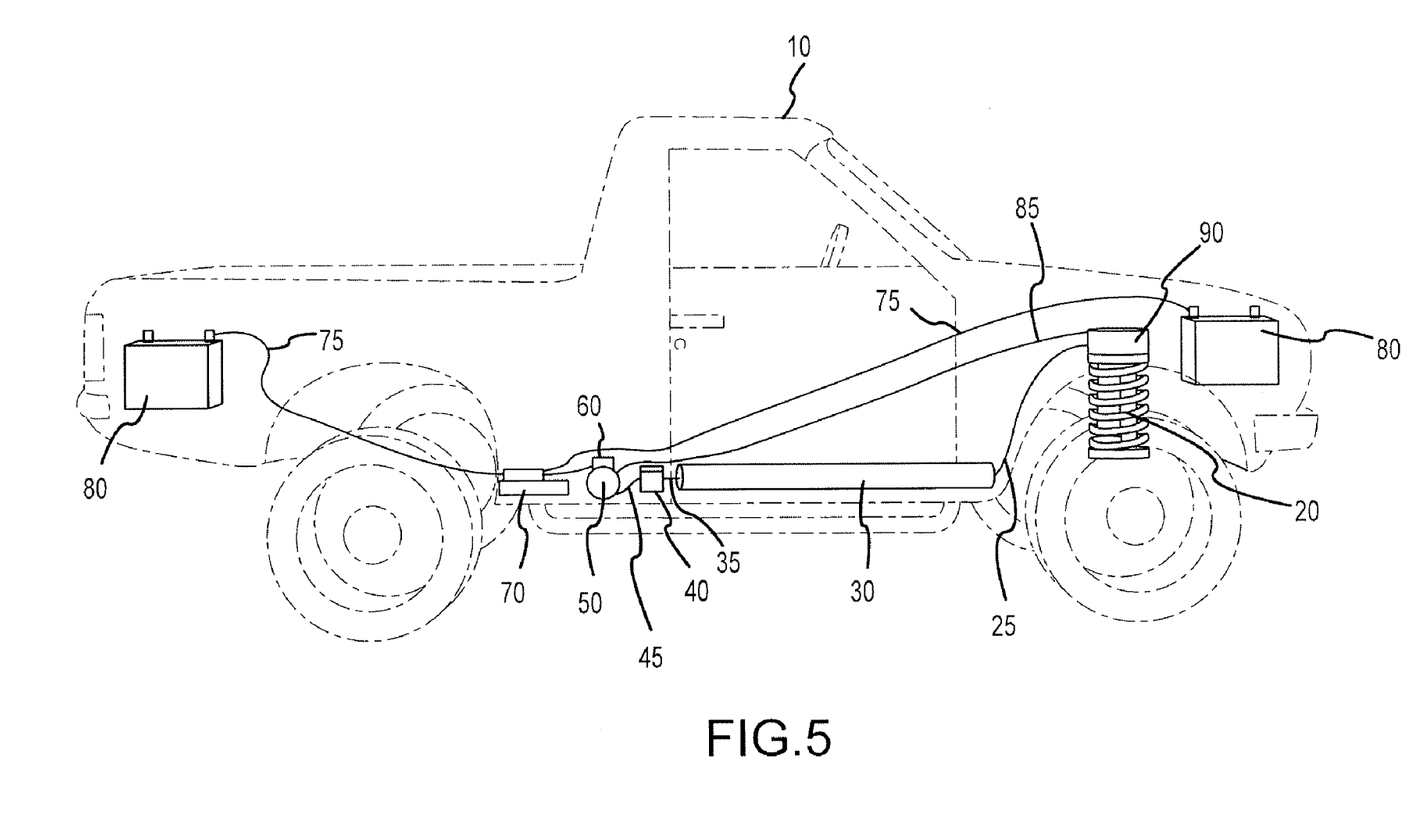
FIG. 5 illustrates a system on a vehicle for charging a battery in accordance with an exemplary embodiment.

In an exemplary embodiment, generator 60 creates electrical power. Optionally, as depicted in FIG. 4, a voltage regulator or other suitable controller 70 is used to regulate voltage between generator 60 and one or more batteries 80. In general, any suitable electronic components may be utilized to control, adjust, monitor, and otherwise regulate delivery of electrical energy from generator 60 to one or more batteries 80. Controller 70 then passes electricity to one or more batteries 80 (i.e., 1, 2, 3, 4, 5, 10, 15, 20, 40, 60 or more batteries) via one or more lines 75, thereby charging one or more batteries 80, as shown in FIG. 5.

Exemplary systems have been tested and depending on the weight of vehicle 10 and other factors, generator 60 is capable of producing, for example, 400-600 watts for every ten minutes of drive time. In an exemplary embodiment having a pump 20 at each of 4 wheels of an SUV of 4,000 pounds or greater, one or more batteries 80 could receive more than 10-15 kilowatts per hour.

In accordance with an exemplary embodiment, motor 50 turns an alternator.

In an exemplary embodiment, one or more batteries 80 are employed as a power source for an electric motor configured to provide power to one or more axles of vehicle 10. In other exemplary embodiments, one or more batteries 80 are employed to power machinery, a power take off ("PTO") shaft, an air compressor, automotive accessories, etc.

In various exemplary embodiments, electrical power created by generator 60 may be used to power electrical components coupled to a vehicle, such as an air conditioner, a light, an arc welder, and/or any other suitable electrical components.

In other embodiments, all or a portion of the electrical power created by generator 60 may be used for electrolysis of water to increase the efficiency of vehicle 10.

In accordance with another exemplary embodiment, valve 40 is configured to open upon demand for electrical power. For example, valve 40 may be configured to open when one or more batteries 80 need charging, during vehicle acceleration or braking, when driving up a steep grade, or when needed to power machinery. However, valve 40 may be configured to open at any suitable time and/or in response to any suitable trigger. Additionally, valve 40 may be configured to open on a scheduled or timed basis.

In accordance with another exemplary embodiment, not shown, motor 50 turns an axle of vehicle 10.

In accordance with yet another exemplary embodiment, not shown, the fluid or air bled from valve 40 is used to directly power machinery, for example, hydraulic machinery such as a hydraulic lift gate.

In accordance with yet another exemplary embodiment, not shown, the fluid or air bled from valve 40 is used to turn a PTO shaft.

In accordance with yet another exemplary embodiment, not shown, the air bled from valve 40 is used to power an air compressor.

In accordance with various other exemplary embodiments, not shown, the fluid or air bled from valve 40 may be used to supercharge and/or turbocharge vehicle 10. Pressurized air released through valve 40 may be directed to the intake area of the engine of vehicle 10 in order to cause forced induction of the engine. Alternatively, pressurized fluid or air released through valve 40 may be utilized to drive a supercharger, such as a positive displacement pump, a dynamic compressor, and the like.

In accordance with yet another exemplary embodiment, not shown, the fluid or air bled from valve 40 may also be used to reduce emissions of vehicle 10. Pressurized air may be directed to the exhaust area of vehicle 10, such as to a catalytic converter, in order to boost the efficiency of the converter. Moreover, because the rate of gaseous reactions tends to increase with pressure, pressurized fluid or air may be utilized to power a system, such as an exhaust gas compressor. In an exemplary embodiment, this may be done in order to obtain more favorable conditions for reduction of undesirable exhaust gas components and/or increase the rate at which undesirable exhaust gas components are removed from the exhaust gas stream.

In exemplary embodiments, and with reference to FIG. 5, the fluid or air bled from valve 40 returns to a reservoir 90 via a conduit 85 (e.g., a low-pressure hose) and is recycled into pump 20 by gravity, suction or residual pressure within valve 40, which may be from about 20 psi to about 200 psi. In accordance with one aspect of an exemplary embodiment, conduit 85 is a rubber (e.g., EPDM, silicone with polyester) synthetic, metal or plastic (e.g., hardened plastic) hose with a fastener, coupling, clamp, bracket, clip or other means known in the art or hereinafter developed, on one or both ends. In accordance with one aspect of an exemplary embodiment, conduit 85 comprises one or more one-way or check valves to prevent leakage of fluid or air back into motor 50. In an exemplary embodiment, reservoir 90 is a central reservoir. In another exemplary embodiment, as illustrated, each pump 20 has a separate reservoir 90. In an exemplary embodiment, conduit 85 provides a cooling effect to surrounding elements.

In various exemplary embodiments, once accumulator 30 has emptied, a vehicle engine, a battery or an auxiliary conventional apparatus will begin to perform the work previously enabled by the fluid or air bled from valve 40.

Figure 6:
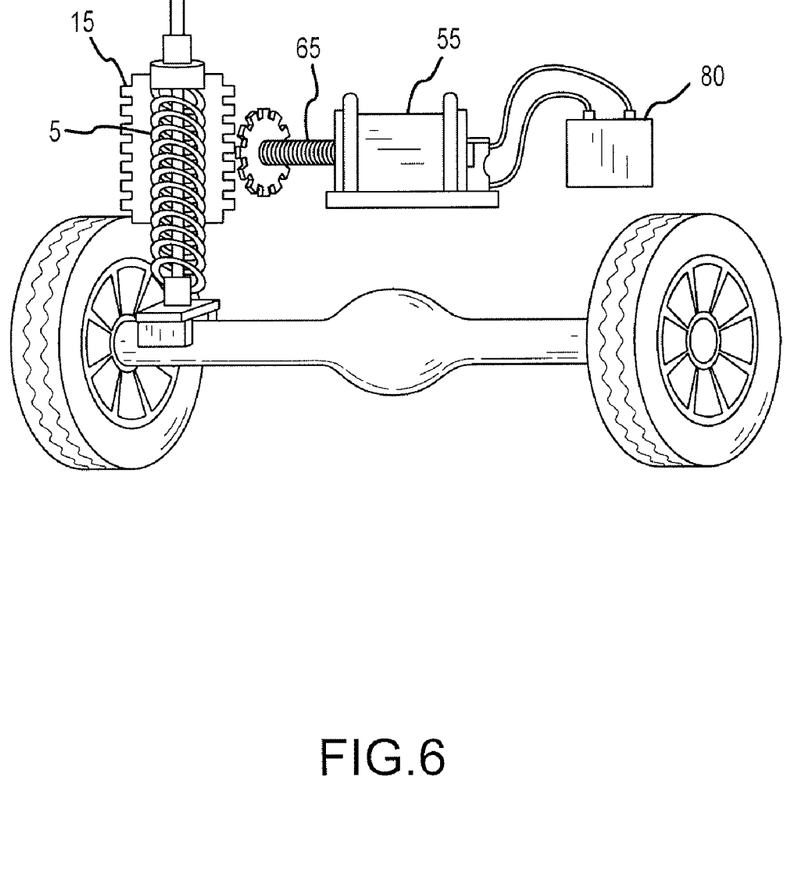
FIG. 6 illustrates a system comprising a motion converter and an energy storage element for charging a battery in accordance with an exemplary embodiment.

It should be understood that other embodiments may be realized and that logical and mechanical changes may be made without departing from the spirit and scope of the invention. For example, in accordance with an exemplary embodiment, and with reference to FIG. 6, the kinetic energy derived from the vertical, reciprocating motion of a suspension system 5 can be transferred to an energy storage element (e.g., a torsion spring 65, similar to that used with a garage door opener, a flywheel or any other system for storing rotational energy) via a motion converter (e.g., a ratcheted toothed ladder arrangement 15 or any other system for converting linear motion to rotary motion). With reference to FIG. 6, the energy storage element may be analogous to accumulator 30. The potential energy stored in the energy storage element can be controllably released and used to perform work, e.g., to turn an alternator 55 and charge a battery 80, or turn a motor, generator, axle, PTO shaft etc.

In accordance with yet another exemplary embodiment, the elements described above may be sold as part of a kit for individual purchase at a retail store. For instance, one or more accumulators 30 may be sold in conjunction with one or more pumps 20, a hydraulic motor 50, an electric generator 60, one or more energy storage elements 110 and/or batteries 80, and the connecting components required (e.g., conduits 35 and 45, other wiring and tubing, mounting brackets, etc.) to assemble the system. Similarly, housing 185, together with its internal mechanisms, may be sold as part of a kit that includes one or more accumulators 30, one or more pumps 20, and the wiring, tubing, and mounting materials needed to install the complete system on a vehicle or other piece of machinery.

Figure 9:
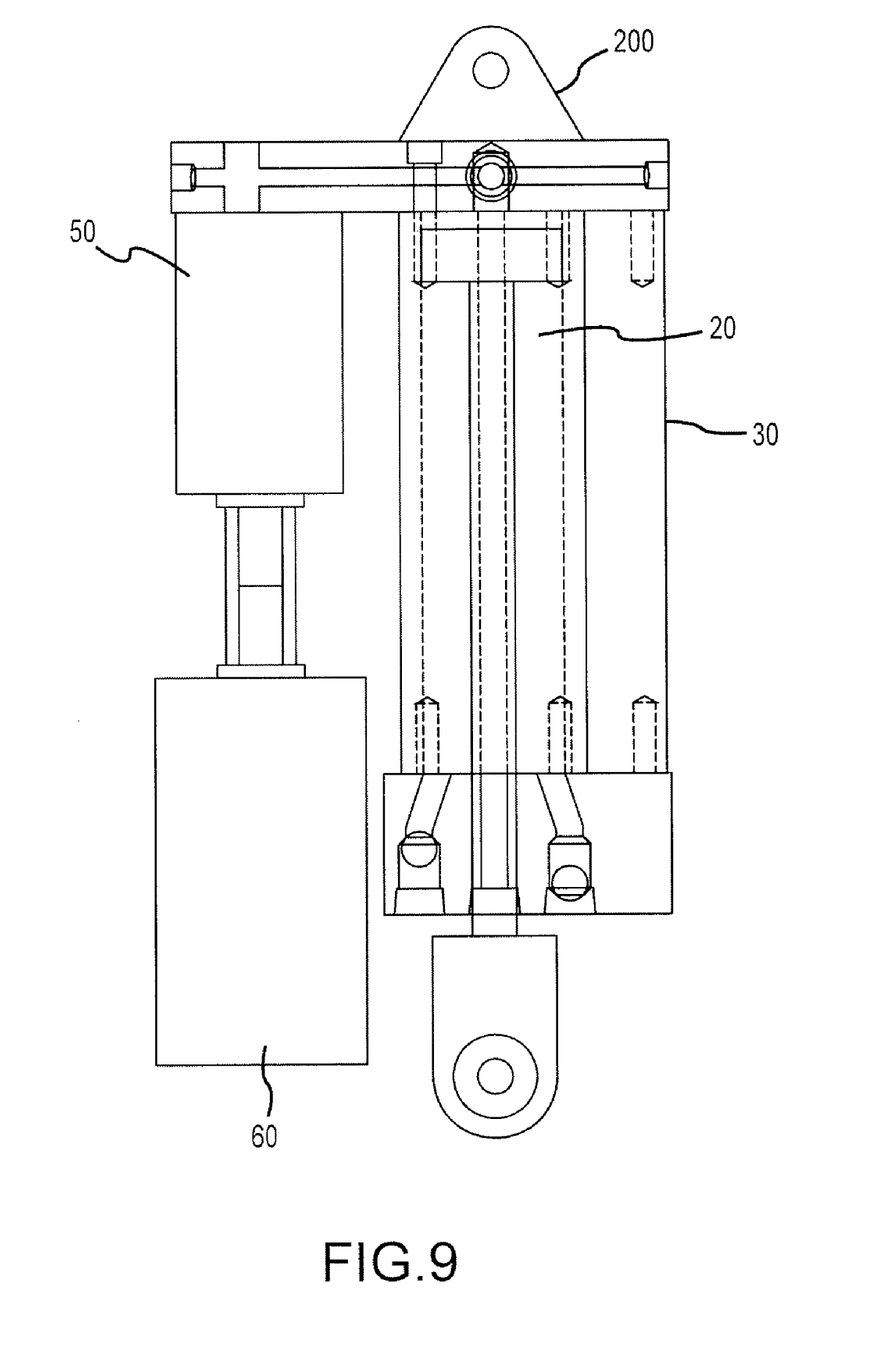
FIG. 9 illustrates an integrated system comprising a pump, an accumulator, a motor, and an alternator in accordance with an exemplary embodiment of the invention.

With reference to FIG. 9, in accordance with yet another exemplary embodiment, the pump 20, accumulator 30, hydraulic motor 50, and alternator 60 may be coupled to a manifold 200. Manifold 200 may include a variety of conduits (not shown), whereby pressurized fluid or gas is conducted, as described above, from pump 20 to accumulator 30 and from accumulator 30 to hydraulic motor 50. Manifold 200 may further operate to return fluid or gas, after passage through hydraulic motor 50, to pump 20 or a separate reservoir (not shown). Thus, manifold 200 eliminates the necessity of multiple hoses connected between pump 20, accumulator 30, and hydraulic motor 50, as fluid or gas may travel through manifold 200 between each element. In an exemplary embodiments, one or more of the pump 20, accumulator 30, hydraulic motor 50, alternator 60, and manifold 200 comprise an extrusion.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

What is claimed is:

1. A system comprising:
    a manifold;
    a pump that is coupled to the manifold and transfers a pressurized fluid through the manifold to a hydraulic accumulator that is coupled to the manifold, wherein the pump comprises a piston coupled to a bucket associated with a tractor, and wherein the pump transfers the pressurized fluid to the hydraulic accumulator as the bucket is lowered;
    a hydraulic motor that is coupled to the manifold and receives the pressurized fluid from the hydraulic accumulator and rotates in response to the receiving the pressurized fluid; and
    an alternator that is coupled to the hydraulic motor and receives a rotational energy of the hydraulic motor.

2. The system of claim 1, wherein a second pump pressurizes fluid in response to absorption of vibrations induced by variations on a driving surface.

3. The system of claim 1, wherein the pressurized fluid is controllably released from the hydraulic accumulator when the pressure within the hydraulic accumulator reaches a threshold.

4. The system of claim 1, wherein the alternator charges an energy storage element.

5. The system of claim 1, wherein the pressurized fluid returns to a reservoir coupled to the hydraulic motor.

6. The system of claim 1, further comprising a second hydraulic accumulator, wherein the second hydraulic accumulator is mounted adjacent to a wheel on a vehicle.

7. A system comprising:
    a manifold;
    a pump that is coupled to the manifold and transfers a pressurized fluid through the manifold to a hydraulic fluid storage unit that is coupled to the manifold, wherein the pump comprises a piston coupled to a bucket associate with a tractor, and wherein the pump transfers the pressurized fluid to the hydraulic fluid storage unit as the bucket is lowered;
    a hydraulic motor that is coupled to the manifold and receives the pressurized fluid from the hydraulic fluid storage unit and rotates in response to the receiving the pressurized fluid; and
    a planetary gearing system coupled between the hydraulic motor and an alternator that transfers a rotational energy of the hydraulic motor to the alternator.

8. The system of claim 7, wherein a second pump pressurizes fluid in response to absorption of vibrations induced by variations on a driving surface.

9. The system of claim 7, wherein the pressurized fluid is controllably released from the hydraulic fluid storage unit when the pressure within the hydraulic fluid storage unit reaches a threshold.

10. The system of claim 7, wherein the alternator is configured to charge an energy storage element.

11. The system of claim 7, further comprising a reservoir configured to receive the pressurized fluid after it exits the hydraulic motor.

12. The system of claim 7, further comprising a second hydraulic fluid storage unit, wherein the second hydraulic fluid storage unit is configured to be mounted adjacent to a wheel on a vehicle.

13. A kit comprising:
a manifold;
a hydraulic accumulator that is configured to couple to the manifold;
a pump that is configured to couple to the manifold, wherein the pump comprises a piston that is configured to couple to a bucket associated with a tractor, and wherein the pump is further configured to transfer a pressurized fluid through the manifold to the hydraulic accumulator as the bucket is lowered; and
a hydraulic motor that is configured to couple to the hydraulic accumulator through the manifold, wherein the hydraulic motor is further configured to receive the pressurized from the hydraulic accumulator and rotate in response to the receiving the pressurized fluid.

14. The kit of claim 13, further comprising a second pump that is, configured to pressurize fluid in response to absorption of vibrations induced by variations on a driving surface.

15. The kit of claim 13, wherein the pressurized fluid is configured to be controllably released from the hydraulic accumulator when the pressure within the hydraulic accumulator reaches a threshold.

16. The kit of claim 13, further comprising an alternator that charges an energy storage element.

17. The kit of claim 13, wherein the pressurized fluid returns to a reservoir coupled to the hydraulic motor.

18. The kit of claim 13, wherein the kit is configured to be sold as part of a package at a retail store.

19. A method comprising:
delivering, by a pump and through a manifold coupled to a hydraulic accumulator, a pressurized fluid to the hydraulic accumulator, wherein the pump comprises a piston coupled to a bucket associated with a tractor, and wherein the pump delivers the pressurized fluid to the hydraulic accumulator as the bucket is lowered;
controllably releasing, through the manifold and from the hydraulic accumulator, the pressurized fluid to a hydraulic motor;
wherein the hydraulic motor rotates in response to the releasing; and
wherein a rotational energy of the hydraulic motor is transferred to an alternator.

20. The method of claim 19, further comprising controllably releasing the pressurized fluid from the hydraulic accumulator when the pressure within the hydraulic accumulator reaches a threshold.

21. The method of claim 19, further comprising returning the pressurized fluid to a reservoir coupled to the hydraulic motor.

* * * * *